United States Patent
Hida et al.

(10) Patent No.: US 8,388,067 B2
(45) Date of Patent: Mar. 5, 2013

(54) SEAT APPARATUS

(75) Inventors: Toshihiko Hida, Aichi (JP); Konomu Tomaiwa, Aichi (JP)

(73) Assignee: Imasen Electric Industrial Co., Ltd., Aichi (JP)

( * ) Notice: Subject to any disclaimer, the term of this patent is extended or adjusted under 35 U.S.C. 154(b) by 144 days.

(21) Appl. No.: 12/972,641

(22) Filed: Dec. 20, 2010

(65) Prior Publication Data

US 2011/0084531 A1   Apr. 14, 2011

(30) Foreign Application Priority Data

Sep. 25, 2009  (JP) ................................ 2009-220195

(51) Int. Cl.
*B60N 2/20* (2006.01)
*B60N 2/23* (2006.01)

(52) U.S. Cl. .................................. 297/362.11; 297/362

(58) Field of Classification Search .................. 297/362, 297/362.11
See application file for complete search history.

(56) References Cited

U.S. PATENT DOCUMENTS

| | | | | |
|---|---|---|---|---|
| 4,304,386 A * | 12/1981 | Nagashima et al. | ...... | 297/362 X |
| 4,335,919 A * | 6/1982 | Nagashima et al. | ......... | 297/362 |
| 4,504,091 A * | 3/1985 | Ohshiro | ........................ | 297/362 |
| 4,986,514 A * | 1/1991 | Ikegaya et al. | ................ | 297/362 |
| 5,350,216 A * | 9/1994 | Ito | ................................ | 297/362 |
| 5,810,442 A * | 9/1998 | Ito et al. | ................... | 297/362.11 |
| 6,428,104 B1 * | 8/2002 | Sakamoto et al. | ....... | 297/362.11 |
| 6,712,430 B2 * | 3/2004 | Ito et al. | ........................ | 297/362 |
| 6,733,076 B2 * | 5/2004 | Grable et al. | .................. | 297/362 |
| 7,500,719 B2 * | 3/2009 | Kojima | .......................... | 297/362 |
| 7,566,099 B2 * | 7/2009 | Catanzarite et al. | ...... | 297/362 X |
| 7,571,962 B2 * | 8/2009 | Thiel et al. | ................. | 297/362 X |
| 7,661,760 B2 * | 2/2010 | Nakaya et al. | ........ | 297/362.11 X |
| 7,673,943 B2 * | 3/2010 | Ohta et al. | ............... | 297/362.11 |
| 7,726,743 B2 * | 6/2010 | Smith et al. | ..................... | 297/362 |
| 7,775,594 B2 * | 8/2010 | Bruck et al. | ................... | 297/362 |
| 7,775,598 B2 * | 8/2010 | Schmitz et al. | ............ | 297/362 X |
| 7,837,268 B2 * | 11/2010 | Becker et al. | ............. | 297/362 X |
| 8,052,215 B2 * | 11/2011 | Ito | ............................. | 297/362.11 |
| 8,118,367 B2 * | 2/2012 | Nathan et al. | .............. | 297/362.11 |
| 2007/0063567 A1 * | 3/2007 | Nakaya et al. | ........... | 297/362.11 |
| 2007/0200408 A1 * | 8/2007 | Ohta et al. | ............... | 297/362.11 |
| 2009/0021066 A1 * | 1/2009 | Nathan et al. | .................. | 297/362 |
| 2009/0066137 A1 | 3/2009 | Ishihara et al. | | |
| 2010/0072796 A1 | 3/2010 | Ishihara et al. | | |

FOREIGN PATENT DOCUMENTS

| | | |
|---|---|---|
| EP | 0938997 A2 | 9/1999 |
| JP | 3578905 A | 10/2004 |
| JP | 4305571 B2 | 7/2009 |

* cited by examiner

*Primary Examiner* — Rodney B White
(74) *Attorney, Agent, or Firm* — Lowe Hauptman Ham & Berner LLP

(57) ABSTRACT

In a case where a manipulation switch is manipulated when a limit switch detects the fact that the seat back is in an upright position, an ECU controls driving of a motor until a sector gear turned in a second turning direction moves a lock lever in a lock release direction at a second abutting portion thereby to cause a lock member to be in a lock release state. Also, in a case where the manipulation switch is manipulated when the limit switch detects the fact that the seat back is not in the upright position, the ECU controls driving of the motor until the limit switch detects the fact that the seat back is in the upright position.

17 Claims, 9 Drawing Sheets

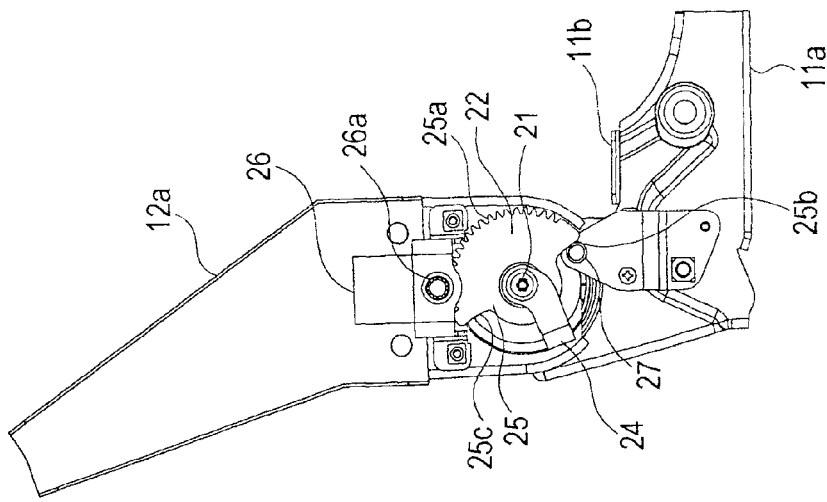
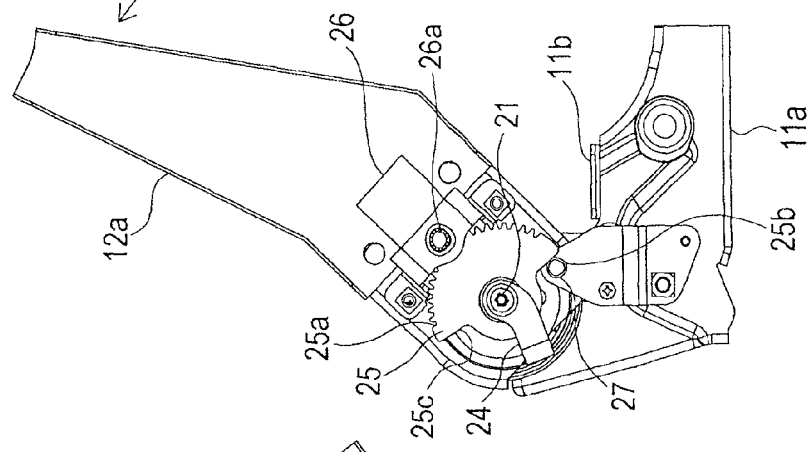
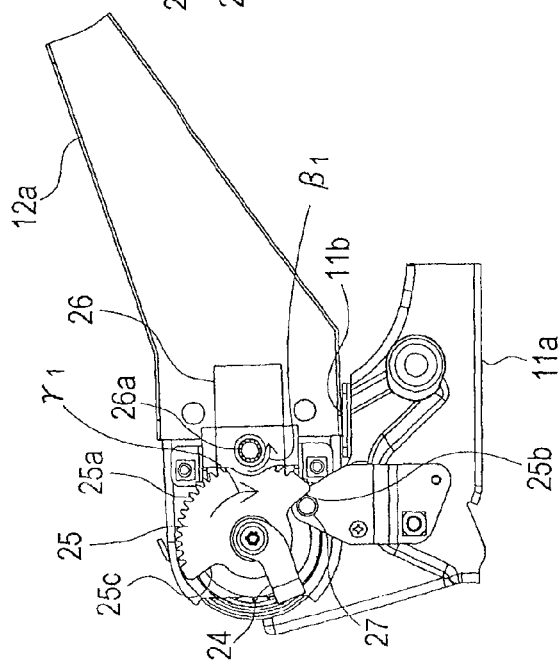
FIG. 9C
FIG. 9B
FIG. 9A

SEAT APPARATUS

CROSS-REFERENCE TO RELATED APPLICATION

This application is based on Japanese Patent Application No. 2009-220195 filed with the Japan Patent Office on Oct. 28, 2009, the entire content of which is hereby incorporated by reference.

BACKGROUND

1. Technical Field

The present invention relates to a seat apparatus in which a seat back can be inclined with respect to a seat cushion.

2. Related Art

As a conventional seat apparatus in which a seat back can be inclined with respect to a seat cushion, a vehicle seat disclosed in Patent Document 1 listed below is known. This vehicle seat includes two manipulating units, i.e., a webbing manipulated for reclining adjustment and a manipulation knob manipulated to incline the seat back forward and fold it over the seat cushion. This seat apparatus is provided with a lock lever having a hook projection engaged with a step portion of a base plate on a free hinge side. Accordingly, the seat back is not inclined forward more than necessary when the webbing is manipulated. This prevents an occupant from feeling cramped between the seat back and the seat cushion when he/she does reclining adjustment while seated.

The document that describes the related art is listed below.
Patent Document 1: Japanese Patent No. 3578905

SUMMARY

The above seat apparatus is configured to allow the occupant to manually fold the seat back. Thus, when the seat back in a forward inclined state is moved back to an upright state, the occupant needs to use his/her energy, which bothers the occupant. However, if a motor or the like is merely adopted to motorize (automate) the inclination of the seat back, a complicated configuration including a control unit, and the like is required, which will increase the production cost.

An object of an aspect according to the present invention is to provide a seat apparatus capable of automating inclination of a seat back by a simple configuration.

To achieve the above object, a seat apparatus according to a first aspect of the present invention is a seat apparatus having a seat cushion supported on a floor surface and a seat back attached to, and inclinable relative to, the seat cushion and moved between an upright position and a forward inclined position, including: a biasing member which biases the seat back in a forward inclined direction; a lock mechanism which can lock the seat back not to be relatively inclinable at the upright position; a lock lever which is supported on the seat cushion and switches the lock mechanism between a lock state and a lock release state, and causes the lock mechanism to be in the lock release state by being moved in a lock release direction and causes the lock mechanism to be in the lock state by being moved in a lock direction along with movement of the seat back in the lock release state to the upright position; a gear which is pivotally supported on the seat back, is configured to be turned in a first turning direction corresponding to the forward inclined direction and in a second turning direction, and has a first abutting portion and a second abutting portion, wherein the first abutting portion is set to abut on a stopper fixed in the seat cushion by turning of the gear in the first turning direction while the second abutting portion is set to abut on the lock lever by turning of the gear in the second turning direction thereby to move the lock lever in the lock release direction; a motor which has a motor shaft meshed with the gear and is attached to the seat back, and causes the gear to be turned in the first turning direction by rotating the motor shaft in a first rotating direction and causes the gear to be turned in the second turning direction by rotating the motor shaft in a second rotating direction; a motor controlling unit which controls driving of the motor; a detecting unit which detects whether or not the seat back is in the upright position; and a manipulating unit which is manipulated when the seat back is to be moved to either the upright position or the forward inclined position, wherein, in a case where the manipulating unit is manipulated when the detecting unit detects the fact that the seat back is in the upright position, the motor controlling unit controls driving of the motor and rotates the motor shaft in the second rotating direction until the gear turned in the second turning direction moves the lock lever in the lock release direction at the second abutting portion thereby to cause the lock mechanism to be in the lock release state, and in a case where the manipulating unit is manipulated when the detecting unit detects the fact that the seat back is not in the upright position, the motor controlling unit controls driving of the motor and rotates the motor shaft in the first rotating direction until the detecting unit detects the fact that the seat back is in the upright position.

A seat apparatus according to a second aspect of the present invention is the seat apparatus according to the first aspect, wherein the detecting unit is in contact with a part of the seat back in the upright position, and this contact state is set to be released by inclination of the seat back from the upright position to the forward inclined position, and the detecting unit detects whether or not the seat back is in the upright position based on the contact state.

In the seat apparatus according to the first aspect, in a case where the manipulating unit is manipulated when the detecting unit detects the fact that the seat back is in the upright position, the motor controlling unit controls driving of the motor and rotates the motor shaft in the second rotating direction until the gear turned in the second turning direction moves the lock lever in the lock release direction at the second abutting portion thereby to cause the lock mechanism to be in the lock release state.

When the manipulating unit is manipulated to incline the seat back in the upright position in the forward inclined direction in this manner, the motor shaft is rotated in the second rotating direction. Since this causes the gear to be turned in the second turning direction, the second abutting portion moves the lock lever in the lock release direction. Consequently, the lock mechanism goes into the lock release state. Accordingly, the seat back in the upright position can automatically be inclined in the forward inclined direction by the biasing force of the biasing member.

Also, in a case where the manipulating unit is manipulated when the detecting unit detects the fact that the seat back is not in the upright position, the motor controlling unit controls driving of the motor and rotates the motor shaft in the first rotating direction until the detecting unit detects the fact that the seat back is in the upright position.

When the manipulating unit is manipulated to move back the seat back in the forward inclined position in the upright direction in this manner, the motor shaft is rotated in the first rotating direction. This causes the gear to be turned in the first turning direction to abut on the stopper at the first abutting portion. Thus, even when the motor shaft is further rotated in the first rotating direction, the gear cannot be turned since it is abutting on the stopper. Accordingly, the motor is moved in a direction corresponding to the second turning direction while meshed with the gear. This movement of the motor causes the seat back, to which the motor is attached, to be moved in a direction corresponding to the second turning direction, that is, the upright direction, with respect to the gear. Thus, the seat back in the forward inclined position can automatically be moved in the upright direction against the biasing force of the biasing member.

In particular, the seat apparatus according to the first aspect can be obtained by adding the aforementioned gear, motor, motor controlling unit, and the like to a conventional seat apparatus in which the seat back is manually inclined. Accordingly, inclination of the seat back can be automated by a simple configuration.

In the seat apparatus according to the second aspect, the detecting unit is in contact with a part of the seat back in the upright position. This contact state is set to be released by inclination of the seat back from the upright position to the forward inclined position. That is, the detecting unit is configured to detect whether or not the seat back is in the upright position based on the contact state. Thus, it is possible to detect whether or not the seat back is in the upright position by a simple configuration.

BRIEF DESCRIPTION OF THE DRAWINGS

The foregoing and other objects, features, aspects and advantages of the invention will become more apparent from the following detailed description when taken in conjunction with the accompanying drawings, in which:

FIGS. 5A and 5B are enlarged views for explaining a function of the limit switch, wherein FIG. 5A shows a contact state between a lever and a moving piece, and FIG. 5B shows a state where the contact is released;

FIGS. 7A to 7C are side views for explaining inclination of a seat back, seen from the sector gear side, in a forward inclined direction, wherein FIG. 7A shows an upright position of the seat back, FIG. 7B shows a state where the seat back is being inclined, and FIG. 7C shows a forward inclined position of the seat back;

FIGS. 8A to 8C are side views for explaining inclination of the seat back, seen from the limit switch side, in the forward inclined direction, wherein FIG. 8A shows the upright position of the seat back, FIG. 8B shows a state where the seat back is being inclined, and FIG. 8C shows the forward inclined position of the seat back; and FIGS. 9A to 9C are side views for explaining inclination of the seat back, seen from the sector gear side, in an upright direction, wherein FIG. 9A shows the forward inclined position of the seat back, FIG. 9B shows a state where the seat back is being moved in the upright direction, and FIG. 9C shows the upright position of the seat back.

DESCRIPTION OF EMBODIMENTS

Figure 1:
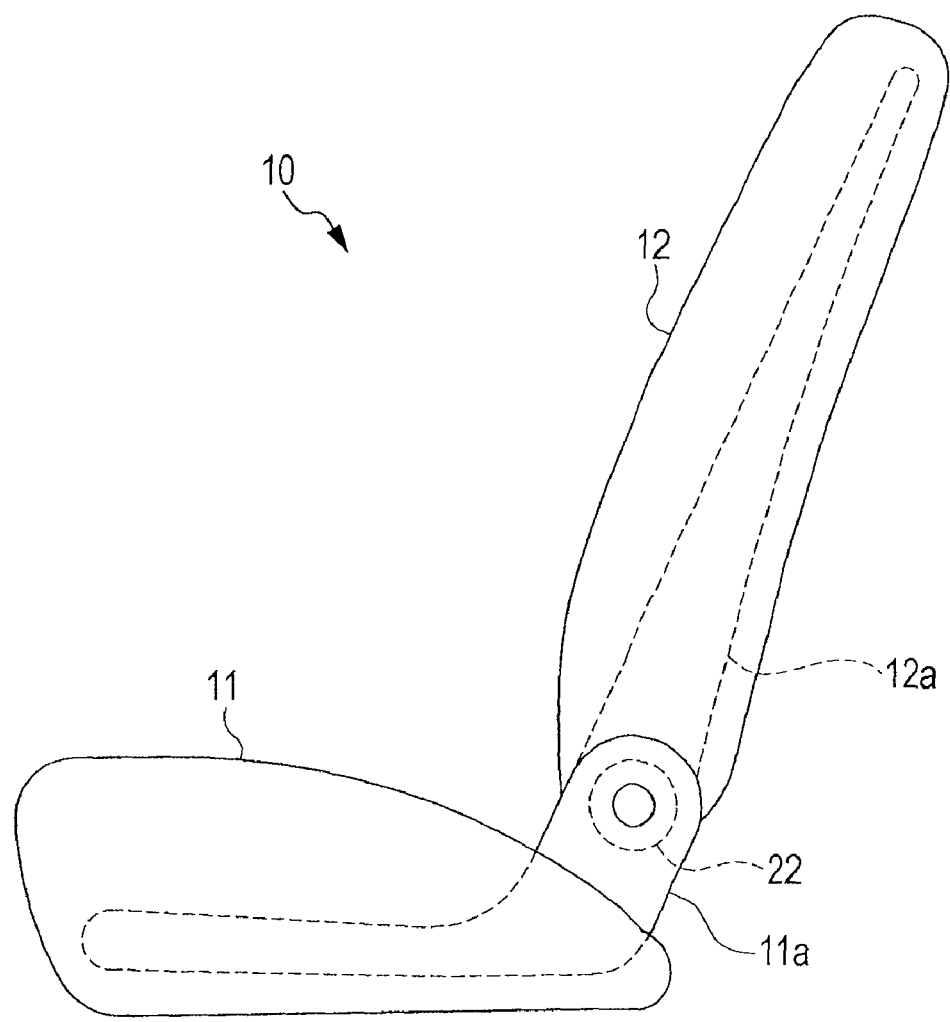
FIG. 1 is a side view schematically showing an example of a seat apparatus according to an aspect of the present invention.

Preferred embodiments of the present invention will be described below with reference to the accompanying drawings, in which like reference characters designate similar or identical parts throughout the several views thereof.

Hereinafter, an embodiment of a seat apparatus 10 according to an aspect of the present invention will be described with reference to the drawings.

The seat apparatus 10 is mounted to be inclinable in a vehicle as a backseat of the vehicle, for example. The seat apparatus 10 includes a seat cushion 11 receiving an occupant's hip and a seat back 12 receiving the occupant's back as shown in FIG. 1. The seat cushion 11 is supported on a floor surface. The seat back 12 is attached to, and inclinable relative to, the seat cushion 11 and is moved between an upright position and a forward inclined position.

Figure 2:
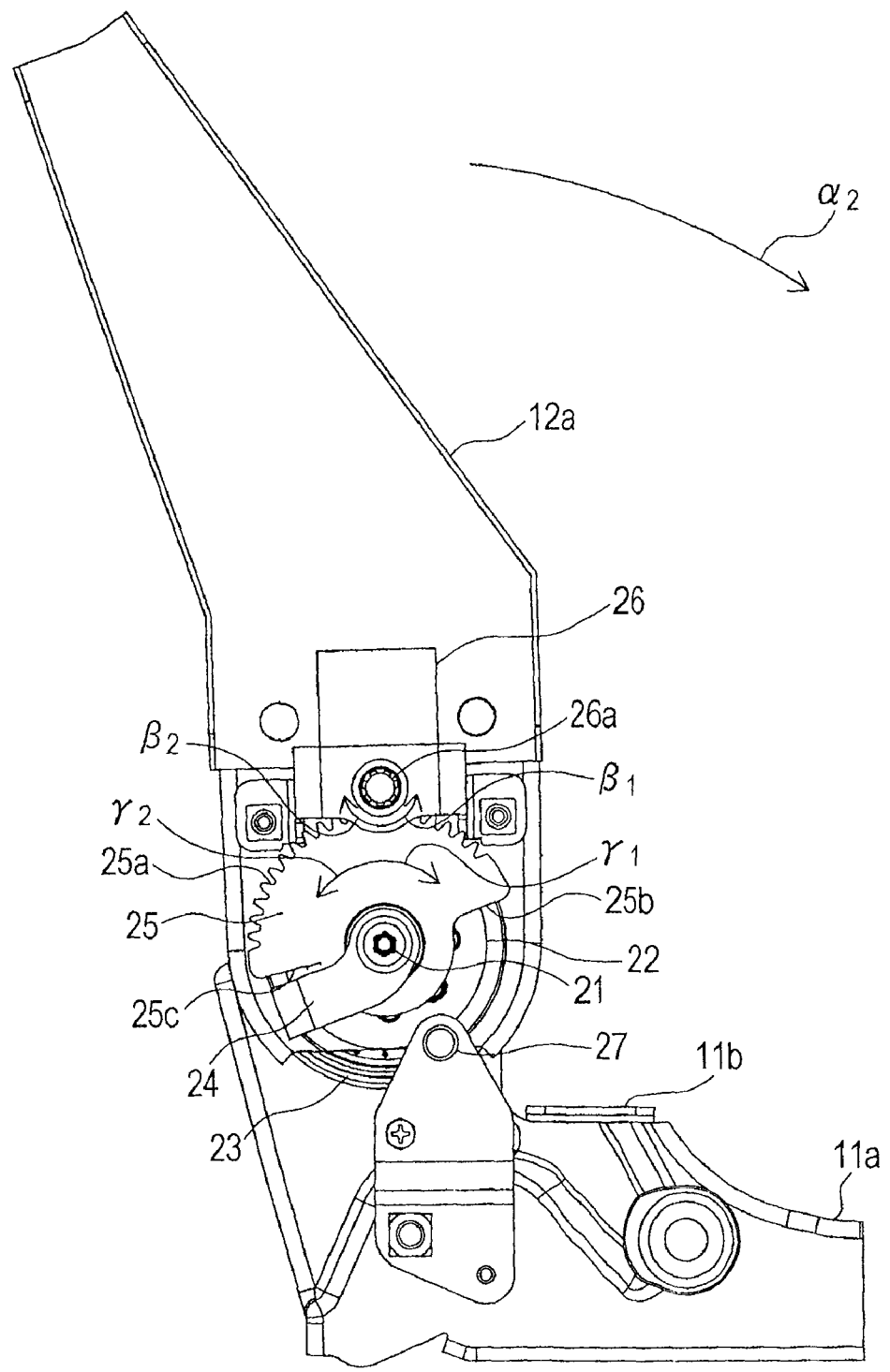
FIG. 2 is a side view of a connecting portion of a seat cushion frame and a seat back frame seen from a sector gear side.
Figure 3:
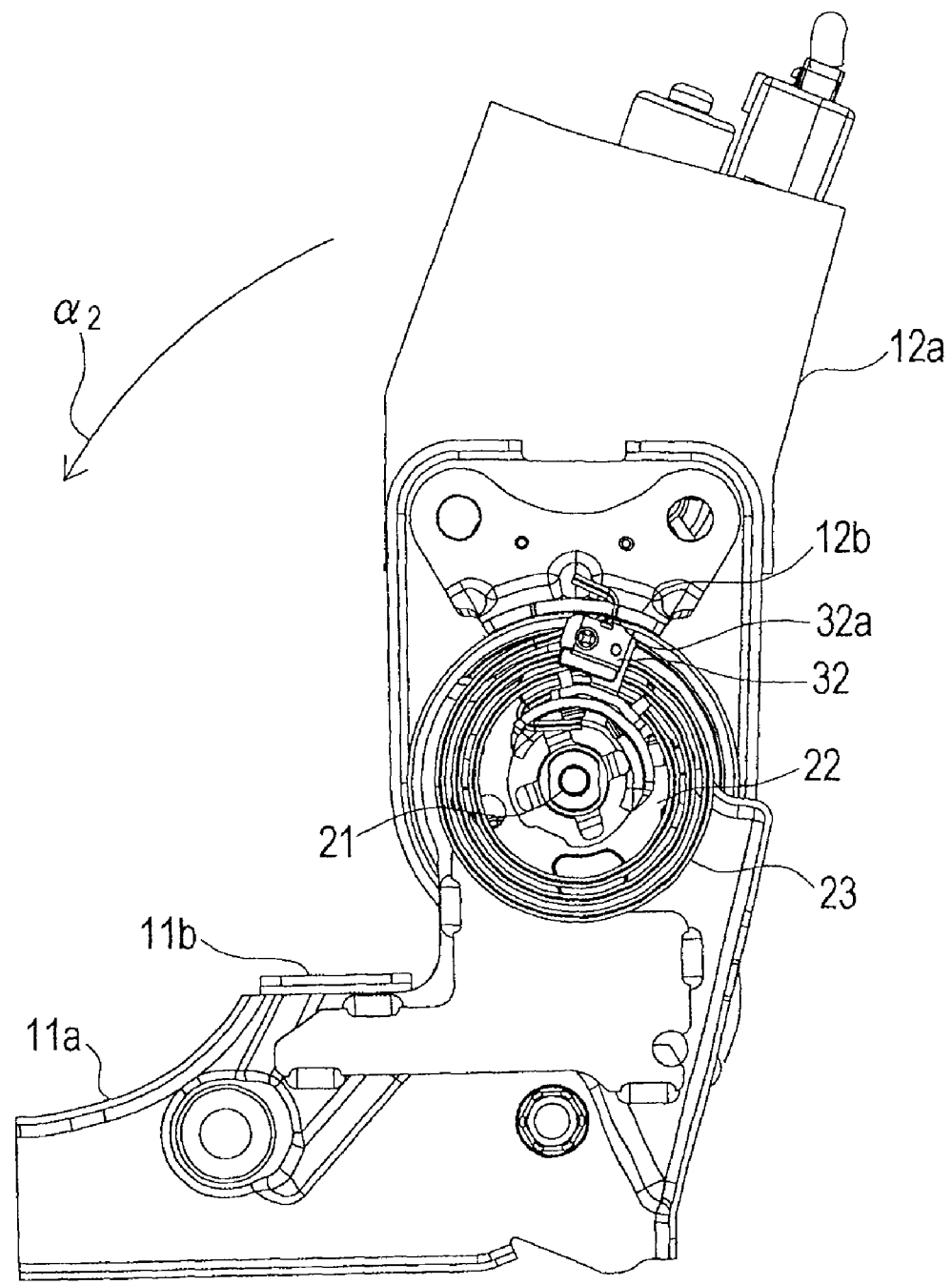
FIG. 3 is a side view of the connecting portion of the seat cushion frame and the seat back frame seen from a limit switch side.

As shown in FIGS. 1 to 3, a seat cushion frame 11a is a framework of the seat cushion 11. Also, a seat back frame 12a is a framework of the seat back 12. These frames 11a and 12a are connected to each other via a connecting shaft 21 and a lock member 22. The lock member 22 has a function of locking the seat back frame 12a, which is in the upright position (position shown in FIGS. 2 and 3), so that the seat back frame 12a cannot be inclined relative to the seat cushion frame 11a. Note that the lock member 22 corresponds to an example of a "lock mechanism" described in the appended claims.

The seat back frame 12a is biased in a forward inclined direction ($\alpha_2$ direction in FIGS. 2 and 3) by a spiral spring 23 arranged around the connecting shaft 21. When the lock member 22 is in a lock release state, the seat back frame 12a is inclined in the forward inclined direction by the biasing force of the spiral spring 23. Due to this inclination, the seat back 12 is inclined forward to the seat cushion 11. Note that the spiral spring 23 corresponds to an example of a "biasing member" described in the appended claims.

The lock member 22 is provided with a lock lever 24 to switch the lock member 22 between a lock state and a lock release state. This lock lever 24 is supported on the seat cushion frame 11a and is turnable around the connecting shaft 21. The lock lever 24 is biased to a lock position by a biasing member (not shown) such as a coil spring. The lock lever 24 is configured to cause the lock member 22 to be in the lock release state by being moved in a lock release direction against the biasing force. The lock lever 24 is also configured to cause the lock member 22 to be in the lock state by being moved in a lock direction by the aforementioned biasing force when the seat back 12 is moved to the upright position during the lock release state.

Also, the seat apparatus 10 includes a sector gear 25 and a motor 26 for turning this sector gear 25. The sector gear 25 is pivotally supported on the seat back frame 12a, around the connecting shaft 21 as a turning center. This sector gear 25 is formed to be meshed at its external gear 25a with a pinion gear 26a provided at a motor shaft of the motor 26 at all times. This external gear 25a is formed at an approximately semicircular portion of the sector gear 25. At a portion opposite the approximately semicircular portion of the sector gear 25 are formed a first abutting portion 25b and a second abutting portion 25c each having a planar portion.

The motor 26 is attached to the seat back frame 12a. Rotation of the pinion gear 26a in a first rotating direction ($\beta_1$ direction in FIG. 2) causes the sector gear 25 meshed with the pinion gear 26a to be turned in a first turning direction ($\gamma_1$ direction in FIG. 2). When the sector gear 25 is turned in the first turning direction in this manner, its first abutting portion 25b abuts on a cylindrical stopper 27 fixed in the seat cushion frame 11a.

Also, rotation of the pinion gear 26a in a second rotating direction ($\beta_2$ direction in FIG. 2) causes the sector gear 25 to be turned in a second turning direction ($\gamma_2$ direction in FIG. 2). When the sector gear 25 is turned in the second turning direction in this manner, its second abutting portion 25c abuts on the lock lever 24. As a result, the lock lever 24 is thrust in the lock release direction. Note that the sector gear 25 corresponds to an example of a "gear" described in the appended claims.

Figure 4:
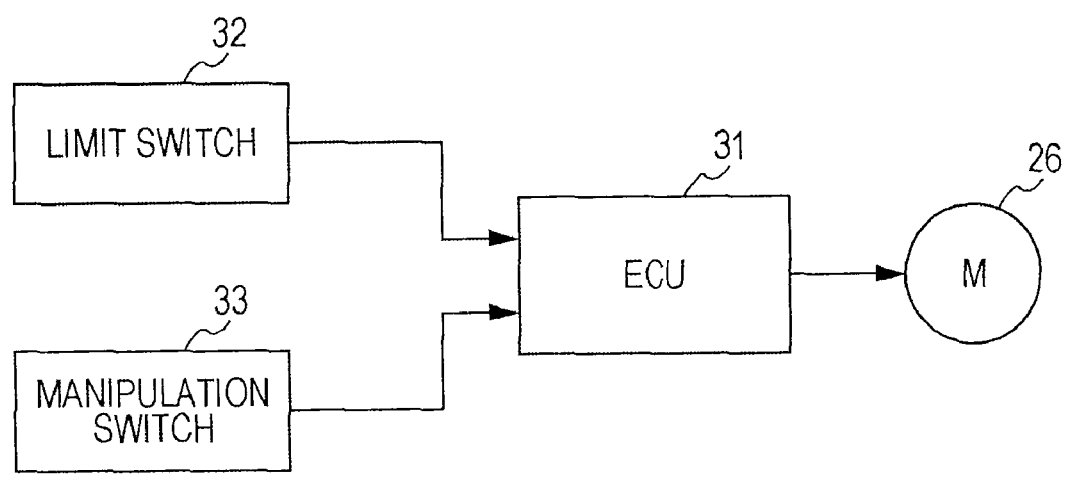
FIG. 4 is a block diagram showing an electric configuration of the seat apparatus.
Figure 5A:
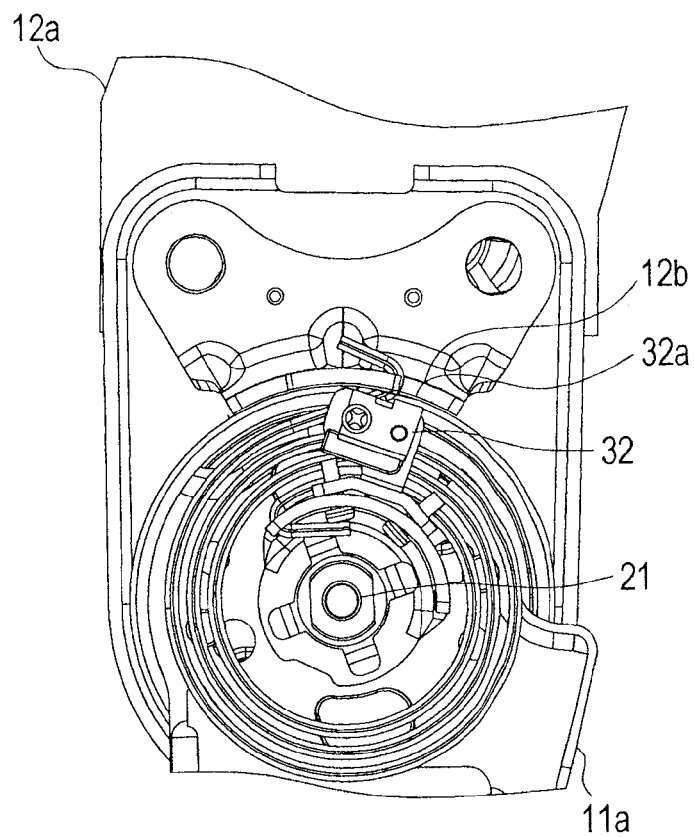
Figure 5B:
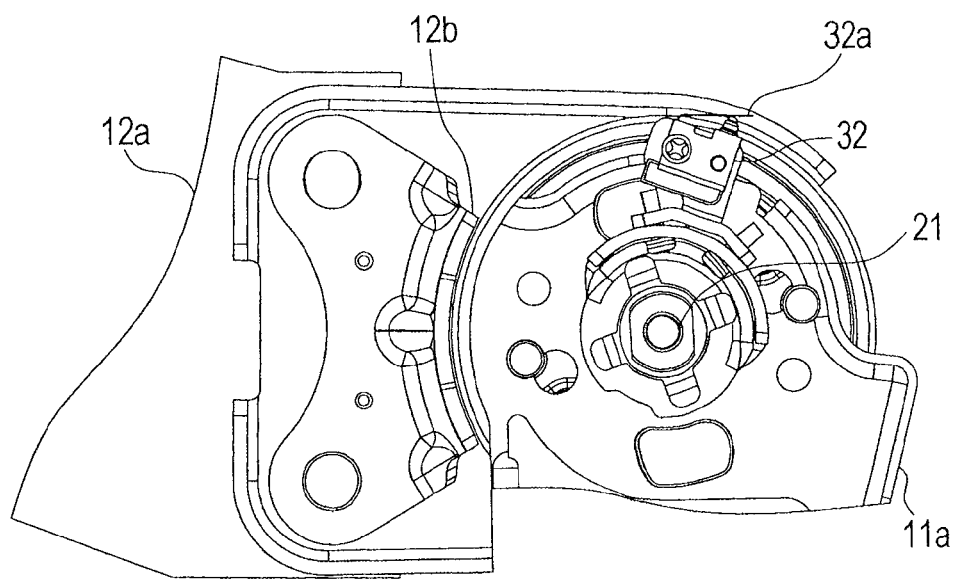
Figure 6:
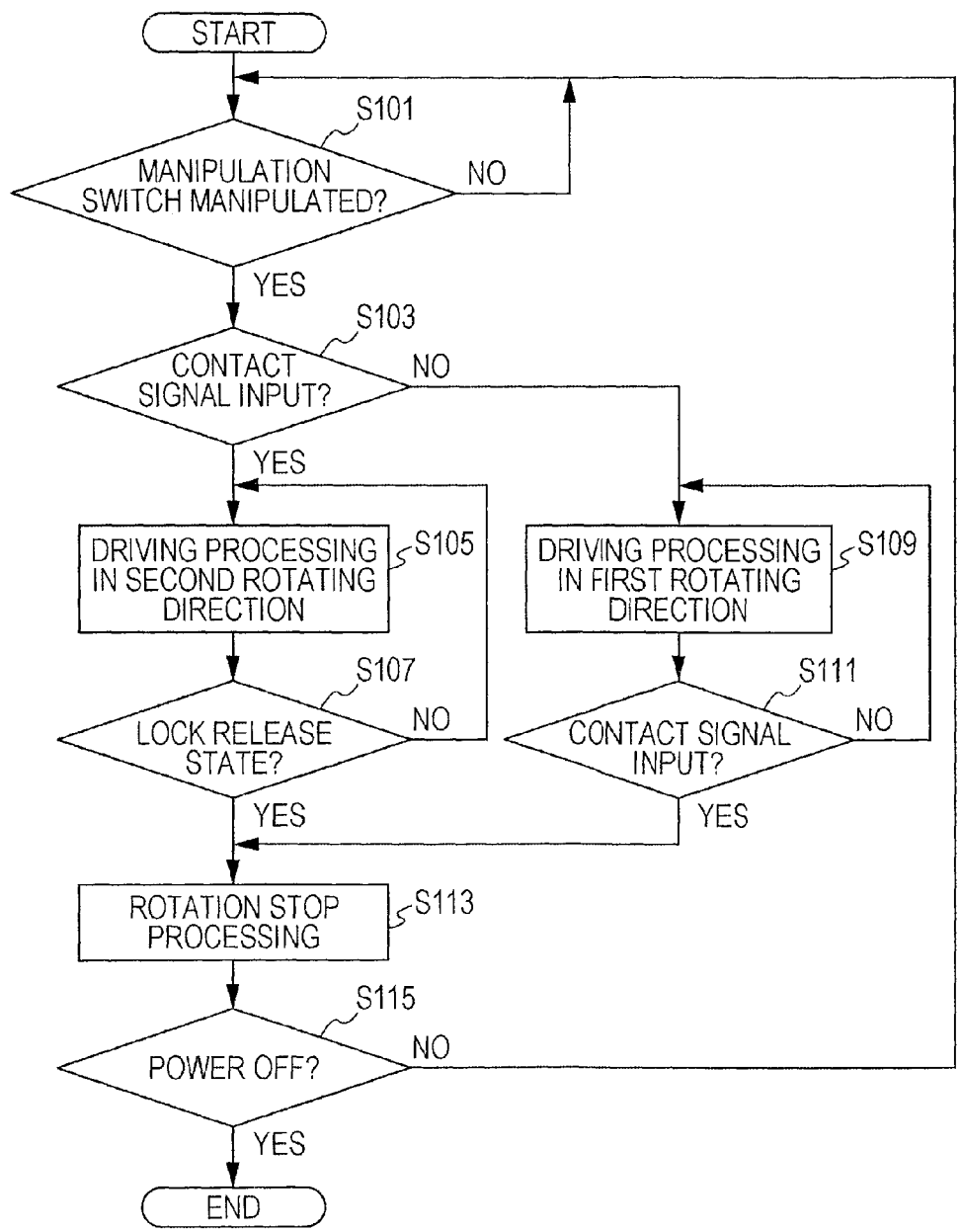
FIG. 6 is a flowchart illustrating a flow of sheet inclination processing by an ECU.
Figure 8C:
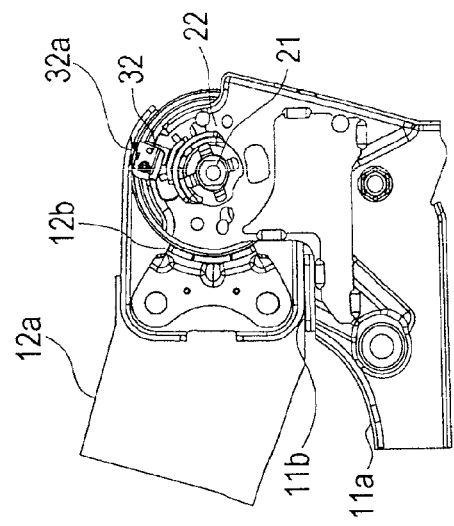
Figure 8B:
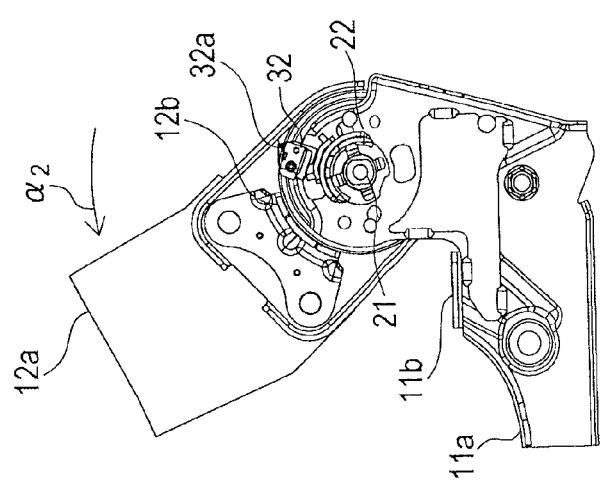

Also, as shown in FIG. 4, the seat apparatus 10 includes an ECU 31, a limit switch 32, and a manipulation switch 33. The ECU 31 is an electronic control unit controlling driving of the motor 26 by executing after-mentioned inclination processing. The limit switch 32 is attached to the seat cushion frame 11a. As shown in FIG. 5A, when the seat back frame 12a is in the upright position, the limit switch 32 is in contact with, by a lever 32a, a moving piece 12b which is a part of the seat back frame 12a. On the other hand, as shown in FIG. 5B, when the seat back frame 12a is inclined in the forward inclined direction, the aforementioned contact state between the lever 32a and the moving piece 12b is released. Thus, the limit switch 32 plays a role of detecting whether or not the seat back 12 is in the upright position based on the aforementioned contact state. When the lever 32a and the moving piece 12b are in the contact state, that is, when the seat back 12 is in the upright position, the limit switch 32 outputs a contact signal to the ECU 31. Note that the spiral spring 23 is not shown in FIG. 5B and after-mentioned FIGS. 8B and 8C for convenience. Also note that the ECU 31 corresponds to an example of a "motor controlling unit" described in the appended claims, and that the limit switch 32 corresponds to an example of a "detecting unit" described in the appended claims.

Also, the manipulation switch 33 is a single button-type switch manipulated when the seat back 12 is to be moved to either the upright position or the forward inclined position. This manipulation switch 33 is arranged at a driver's side door, for example. When pressed by an occupant, the manipulation switch 33 outputs a manipulation signal to the ECU 31. Note that the manipulation switch 33 corresponds to an example of a "manipulating unit" described in the appended claims.

The ECU 31 includes a driving circuit to control driving of the motor 26. In a case where a manipulation signal is input from the manipulation switch 33 while a contact signal is input from the limit switch 32, the ECU 31 controls driving of the motor 26 to rotate the pinion gear 26a in the second rotating direction. As a result, the seat back 12 is inclined to the forward inclined position. In contrast, in a case where the manipulation signal is input from the manipulation switch 33 when no contact signal is input from the limit switch 32, the ECU 31 controls driving of the motor 26 to rotate the pinion gear 26a in the first rotating direction. As a result, the seat back 12 is moved to the upright position.

Next, seat inclination processing by the ECU 31 will be described with reference to FIGS. 6 to 9.

Figure 7A:
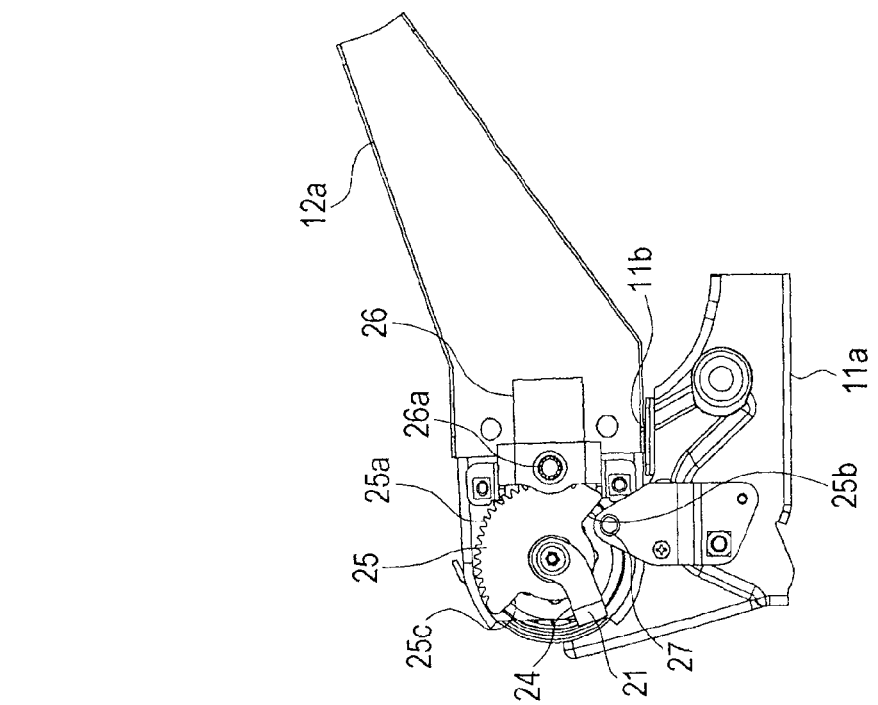
Figure 7B:
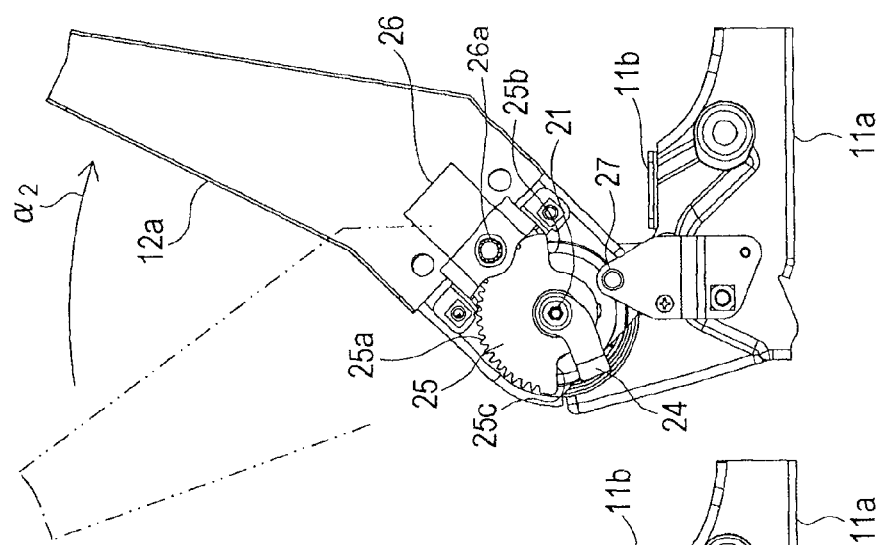
Figure 7C:
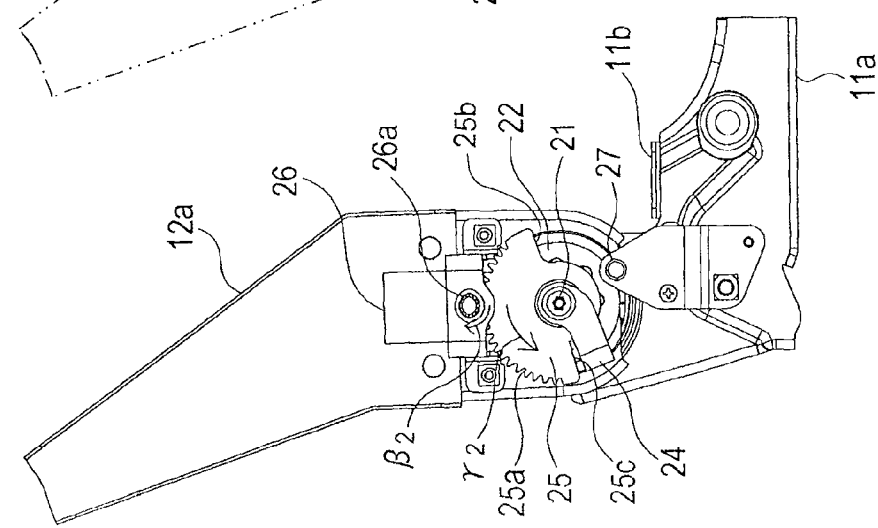
Figure 8A:
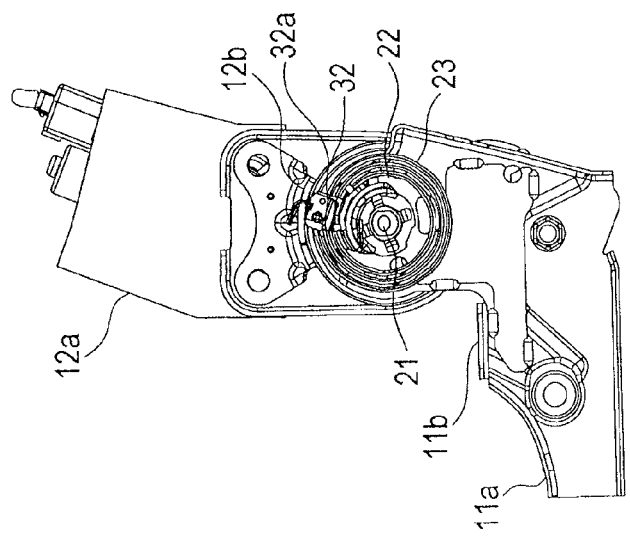

In a case where an occupant wishes to incline the seat back 12 to the forward inclined position when the seat back 12 is in the upright position shown in FIGS. 7A and 8A for the purpose of baggage loading or the like, he/she presses the manipulation switch 33. Accordingly, the ECU 31 makes a determination of Yes at Step 5101 in FIG. 6. Subsequently, whether or not a contact signal has been input from the limit switch 32 is determined at Step S103.

At this stage, the lever 32a of the limit switch 32 and the moving piece 12b are in the contact state. Thus, the contact signal has been input from the limit switch 32 to the ECU 31. Accordingly, the ECU 31 makes a determination of Yes at Step S103. Subsequently, driving processing is performed at Step S 105. In this manner, the control of driving of the motor 26 causes the pinion gear 26a to be rotated in the second rotating direction ($\beta_2$ direction in FIG. 7A).

Accordingly, the sector gear 25 meshed with the pinion gear 26a is turned in the second turning direction ($\gamma_2$ direction in FIG. 7A), and its second abutting portion 25c abuts on the lock lever 24. Then, when the pinion gear 26a is further rotated in the second rotating direction, along with which the sector gear 25 is further turned in the second turning direction, the lock lever 24 is thrust in the lock release direction by the second abutting portion 25c. Consequently, the lock member 22 goes into the lock release state.

Next, whether or not the lock member 22 is in the lock release state is determined at Step S107. When the lock member 22 is in the lock release state as described above (Yes in S107), processing to stop rotation of the motor is performed at Step S113. Processing from Step S101 to Step S113 is repeated until the power is turned off (until the ECU 31 makes a determination of Yes at Step S115). Note that, in the determination processing at Step S107, whether or not the lock member 22 is in the lock release state is determined by estimation of the turning position of the sector gear 25 based on the rotating position of the pinion gear 26a calculated in accordance with pulses output from the motor 26. In addition to this, however, whether or not the lock member 22 is in the lock release state may also be determined in accordance with a lapse of estimated time considered necessary for the lock member 22 to be in the lock release state, for example. Also, whether or not the lock member 22 is in the lock release state may be determined based on the shutoff of input of the contact signal from the limit switch 32.

When the lock member 22 is in the lock release state as described above, the seat back 12 as well as the seat back frame 12a is automatically inclined in the forward inclined direction ($\alpha_2$ direction in FIGS. 7B and 8B) by the biasing force of the spiral spring 23. Since the limit switch 32 is attached to the seat cushion frame 11a, the contact between the lever 32a of the limit switch 32 and the moving piece 12b of the seat back frame 12a is released. As a result, input of the contact signal from the limit switch 32 to the ECU 31 is shut off.

When the seat back 12 is inclined to the forward inclined position, the seat back frame 12a abuts on a frame stopper 11b. Accordingly, the aforementioned inclination is stopped (refer to FIGS. 7C and 8C).

On the other hand, in a case where the occupant wishes to move back the seat back 12 in the forward inclined position shown in FIG. 9A to the upright position, he/she presses the manipulation switch 33. Accordingly, the ECU 31 makes a determination of Yes at Step S101 in FIG. 6. Subsequently, whether or not the contact signal has been input from the limit switch 32 is determined at Step S103.

At this stage, the contact signal from the limit switch 32 is shut off. Accordingly, the ECU 31 makes a determination of No at Step S103. Subsequently, driving processing is performed at Step S109. In this manner, the control of driving of the motor 26 causes the pinion gear 26a to be rotated in the first rotating direction ($\beta_1$ direction in FIG. 9A).

Accordingly, the sector gear 25 meshed with the pinion gear 26a is turned in the first turning direction ($\gamma_1$ direction in FIG. 9A), and its first abutting portion 25b abuts on the stopper 27. Then, when the pinion gear 26a is further rotated in the first rotating direction, the sector gear 25 is to be further turned in the first turning direction along with the further rotation. However, the sector gear 25 cannot be turned since it is abutting on the stopper 27. Instead, therefore, the motor 26 moves in a direction corresponding to the second turning direction while meshed with the sector gear 25.

This movement of the motor 26 causes the seat back frame 12a, to which the motor 26 is attached, to be moved in a direction corresponding to the second turning direction, that is, the upright direction ($\alpha_1$ direction in FIG. 9B), with respect to the sector gear 25. Thus, the seat back 12 in the forward inclined position can automatically be moved toward the upright position against the biasing force of the spiral spring 23 by the driving force of the motor 26, as shown in FIG. 9B.

Then, when the seat back 12 is moved to the upright position as shown in FIG. 9C, the lever 32a of the limit switch 32 and the moving piece 12b of the seat back frame 12a are in the contact state. Thus, the contact signal is input from the limit switch 32 to the ECU 31. Accordingly, the ECU 31 makes a determination of Yes at Step S111. Subsequently, processing to stop rotation of the motor is performed at Step S113.

As described above, in the seat apparatus 10 according to the present embodiment, in a case where the manipulation switch 33 is manipulated when the limit switch 32 detects the fact that the seat back 12 is in the upright position, the ECU 31 controls driving of the motor 26 and rotates the pinion gear 26a in the second rotating direction until the sector gear 25 turned in the second turning direction moves the lock lever 24 in the lock release direction at the second abutting portion 25c thereby to cause the lock member 22 to be in the lock release state.

When the manipulation switch 33 is manipulated to incline the seat back 12 in the upright position in the forward inclined direction in this manner, the pinion gear 26a is rotated in the second rotating direction. Since this causes the sector gear 25 to be turned in the second turning direction, the second abutting portion 25c moves the lock lever 24 in the lock release direction. Consequently, the lock member 22 goes into the lock release state. Accordingly, the seat back 12 in the upright position can automatically be inclined in the forward inclined direction by the biasing force of the spiral spring 23.

Also, in a case where the manipulation switch 33 is manipulated when the limit switch 32 detects the fact that the seat back 12 is not in the upright position, the ECU 31 controls driving of the motor 26 and rotates the pinion gear 26a in the first rotating direction until the limit switch 32 detects the fact that the seat back 12 is in the upright position.

When the manipulation switch 33 is manipulated to move back the seat back 12 in the forward inclined position in the upright direction in this manner, the pinion gear 26a is rotated in the first rotating direction. This causes the sector gear 25 turned in the first turning direction to abut on the stopper 27 at the first abutting portion 25b. Thus, the motor 26 is moved in a direction corresponding to the second turning direction while meshed with the sector gear 25. This causes the seat back 12, to which the motor 26 is attached, to be moved in a direction corresponding to the second turning direction, that is, the upright direction, with respect to the sector gear 25. Thus, the seat back 12 in the forward inclined position can automatically be moved in the upright direction against the biasing force of the spiral spring 23.

In particular, the seat apparatus according to an aspect of the present invention can be obtained by adding the aforementioned sector gear 25, motor 26, ECU 31, and the like to a conventional seat apparatus in which the seat back 12 is manually inclined. Accordingly, inclination of the seat back can be automated by a simple configuration.

Also, the seat apparatus 10 according to the present embodiment includes the limit switch 32 for detecting whether or not the seat back 12 is in the upright position. This limit switch 32 is in contact with, by its lever 32a, the moving piece 12b of the seat back 12 in the upright position. The contact state is set to be released by inclination of the seat back 12 from the upright position to the forward inclined position. In other words, the limit switch 32 is configured to detect whether or not the seat back 12 is in the upright position based on the contact state. Accordingly, in this seat apparatus 10, whether or not the seat back 12 is in the upright position can be detected by a simple configuration.

Note that the present invention is not limited to the above embodiment but may be embodied in the following manner. In this case as well, similar effects to those of the above embodiment can be obtained.

(1) In the above embodiment, a gear such as an external gear or an internal gear may be adopted instead of the sector gear 25. In this case, such a gear is provided with abutting portions corresponding to the first abutting portion 25b and the second abutting portion 25c at portions other than tooth portions. In this case as well, similar effects to those in the case of adopting the sector gear 25 can be obtained.

(2) The seat apparatus 10 may also be adopted as a seat mounted in a vehicle or the like, not only as a backseat of a vehicle.

While the invention has been illustrated and described in detail, the foregoing description is in all aspects illustrative and not restrictive. It is therefore understood that numerous modifications and variations can be devised without departing from the spirit and scope of the invention.

What is claimed is:

1. A seat apparatus, comprising:
   a seat cushion;
   a seat back attached to, and inclinable relative to, the seat cushion and movable between an upright position and a forward inclined position;
   a biasing member which biases the seat back in a forward inclined direction;
   a lock mechanism configured to lock the seat back at the upright position;
   a lock lever which is supported on the seat cushion and configured to switch the lock mechanism between a lock state and a lock release state, the lock lever moveable in a lock release direction to cause the lock mechanism to be in the lock release state, the lock lever moveable in a lock direction to cause the lock mechanism to be in the lock state when the seat back reaches the upright position;
   a gear which is pivotally supported on the seat back, is configured to be turned in a first turning direction corresponding to the forward inclined direction and in a second turning direction, and has a first abutting portion and a second abutting portion, wherein the first abutting portion is set to abut on a stopper fixed in the seat cushion by turning of the gear in the first turning direction while the second abutting portion is set to abut on the lock lever by turning of the gear in the second turning direction thereby to move the lock lever in the lock release direction;
   a motor which has a motor shaft meshed with the gear and is attached to the seat back, and is configured to cause the gear to be turned in the first turning direction by rotating the motor shaft in a first rotating direction and to cause the gear to be turned in the second turning direction by rotating the motor shaft in a second rotating direction;

a motor controlling unit configured to control driving of the motor;

a detecting unit configured to detect whether or not the seat back is in the upright position; and a manipulating unit configured to be manipulated when the seat back is to be moved to either the upright position or the forward inclined position, wherein, in a case where the manipulating unit is manipulated when the detecting unit detects that the seat back is in the upright position, the motor controlling unit is configured to control the driving of the motor to rotate the motor shaft in the second rotating direction until the gear turned in the second turning direction moves the lock lever in the lock release direction at the second abutting portion thereby to cause the lock mechanism to be in the lock release state, and in a case where the manipulating unit is manipulated when the detecting unit detects that the seat back is not in the upright position, the motor controlling unit is configured to control the driving of the motor to rotate the motor shaft in the first rotating direction to move the seat back, after the first abutting portion has abutted on the stopper, until the detecting unit detects the fact that the seat back is in the upright position.

2. The seat apparatus according to claim 1, wherein
the detecting unit is in contact with a part of the seat back in the upright position, and this contact state is set to be released by inclination of the seat back from the upright position to the forward inclined position, and
the detecting unit is configured to detect whether or not the seat back is in the upright position based on the contact state.

3. A seat apparatus having a seat back which is attached to a seat cushion and moves between an upright position and a forward inclined position, comprising:
a gear pivotally supported on the seat back and including a first abutting portion which abuts on a stopper fixed to the seat cushion;
a motor attached to the seat back and having a motor shaft which is meshed with the gear; and
a motor controlling unit which controls the motor,
wherein the motor controlling unit rotates the motor shaft of the motor in a first direction according to an external input so as to press the first abutting portion of the gear against the stopper, and then moves the seat back to the upright position along with the motor.

4. The seat apparatus according to claim 3, further comprising:
a detecting unit which detects whether or not the seat back is in the upright position,
wherein the motor controlling unit rotates the motor shaft of the motor in the first direction until the detecting unit detects the fact that the seat back is in the upright position.

5. The seat apparatus according to claim 4, further comprising:
a lock mechanism which locks the seat back in the upright position when the seat back reaches the upright position.

6. The seat apparatus according to claim 5, further comprising:
a biasing member which biases the seat back in a forward inclined direction; and
a lock lever which releases the seat back locked by the lock mechanism,
wherein, when the seat back is in the upright position, the motor controlling unit releases, via the lock lever and according to the external input, the seat back locked by the lock mechanism.

7. The seat apparatus according to claim 6, wherein
the gear includes a second abutting portion which presses the lock lever,
the lock lever is set to release the seat back locked by the lock mechanism when the lock lever is pressed by the second abutting portion, and
the motor controlling unit rotates the motor shaft of the motor in a second direction so as to press the lock lever by the second abutting portion of the gear, and then releases the seat back locked by the lock mechanism.

8. The seat apparatus according to claim 7, wherein
the detecting unit includes a lever which is in contact with a part of the seat back in the upright position, and detects whether or not the seat back is in the upright position based on the contact state between the lever and the seat back.

9. A seat apparatus, comprising:
a seat cushion;
a seat back which is attached to the seat cushion and pivotable between an upright position and a forward inclined position;
a gear which is pivotally supported on the seat back to be rotatable about an axis, and includes a first abutting portion for abutting a stopper fixed to the seat cushion; and
a motor attached to the seat back and having a motor shaft which is meshed with the gear;
wherein, in response to a rotation of the motor shaft in a first direction,
the first abutting portion of the gear is pressed, by the rotation of the motor shaft, against the stopper, and
the seat back is moved, by the rotation of the motor shaft, to the upright position along with the motor while the gear is kept irrotational about the axis due to abutment between the first abutting portion and the stopper.

10. The seat apparatus according to claim 9, further comprising a motor controlling unit configured to control the motor.

11. The seat apparatus according to claim 10, further comprising:
a detecting unit configured to detect whether or not the seat back is in the upright position,
wherein the motor controlling unit is configured to control, according to an external input, the motor to rotate the motor shaft in the first direction until the detecting unit detects that the seat back is in the upright position.

12. The seat apparatus according to claim 11, further comprising:
a lock mechanism configured to lock the seat back in the upright position when the seat back reaches the upright position.

13. The seat apparatus according to claim 12, further comprising:
a biasing member biasing the seat back toward the forward inclined position; and
a lock lever configured to release the seat back locked by the lock mechanism,
wherein, when the seat back is in the upright position, the motor controlling unit is configured to release, via the lock lever and according to the external input, the seat back locked by the lock mechanism.

14. The seat apparatus according to claim 13, wherein
the gear includes a second abutting portion for pressing the lock lever,
the lock lever is configured to release the seat back locked by the lock mechanism when the lock lever is pressed by the second abutting portion, and
the motor controlling unit is configured to control the motor to rotate the motor shaft in a second direction opposite to the first direction so as to press the second abutting portion of the gear against the lock lever and to release the seat back locked by the lock mechanism.

15. The seat apparatus according to claim 14, wherein
the detecting unit includes a lever which is in contact with a part of the seat back in the upright position, and
the detecting unit is configured to detect whether or not the seat back is in the upright position based on a contact state between the lever and the part of the seat back.

16. The seat apparatus according to claim 9, wherein, in response to the rotation of the motor shaft in the first direction and when the seat back is at an intermediate position between the upright position and the forward inclined position,
during a first period, the gear is rotated, by the rotation of the motor shaft and while the seat back is irrotational relative to the seat cushion, until the first abutting portion of the gear is pressed against the stopper, and
during a second period subsequent to the first period, the seat back is moved, by the rotation of the motor shaft and while the gear is kept irrotational about the axis due to abutment between the first abutting portion and the stopper, to the upright position along with the motor.

17. The seat apparatus according to claim 16, wherein
during the first period, the gear is rotated in a first rotational direction, and
during the second period, the seat back is rotated in a second rotational direction opposite to the first rotational direction.

* * * * *